United States Patent
Crawford et al.

(10) Patent No.: US 7,773,202 B2
(45) Date of Patent: Aug. 10, 2010

(54) LASER SPOT TRACKER AND TARGET IDENTIFIER

(75) Inventors: Ian D. Crawford, Longwood, FL (US); Noal Chandler, Sanford, FL (US); John Harwick, Sanford, FL (US); William Hudson, Apopka, FL (US); Dwight Wildon, Orlando, FL (US)

(73) Assignee: Analog Modules, Inc., Longwood, FL (US)

( * ) Notice: Subject to any disclaimer, the term of this patent is extended or adjusted under 35 U.S.C. 154(b) by 0 days.

(21) Appl. No.: 11/423,367

(22) Filed: Jun. 9, 2006

(65) Prior Publication Data

US 2009/0225299 A1    Sep. 10, 2009

Related U.S. Application Data

(60) Provisional application No. 60/688,962, filed on Jun. 9, 2005.

(51) Int. Cl.
    *G01C 3/08* (2006.01)
(52) U.S. Cl. ..................................... 356/4.07
(58) Field of Classification Search ....... 356/3.01–3.15, 356/4.01–4.1, 5.01–5.15, 6–22
    See application file for complete search history.

(56) References Cited

U.S. PATENT DOCUMENTS

| | | | |
|---|---|---|---|
| 3,877,157 A * | 4/1975 | Ashford et al. ............... 434/22 |
| 3,941,483 A * | 3/1976 | Ferrin ..................... 356/141.1 |
| 4,721,385 A | 1/1988 | Jelalian et al. | |
| 4,792,230 A | 12/1988 | Naganuma et al. | |
| 4,812,035 A | 3/1989 | Freedman et al. | |
| 4,830,486 A | 5/1989 | Goodwin | |
| 4,846,571 A | 7/1989 | Jelalian et al. | |
| 4,856,893 A | 8/1989 | Breen | |
| 5,311,353 A | 5/1994 | Crawford | |
| 5,350,134 A | 9/1994 | Crawford | |
| 6,646,479 B1 | 11/2003 | Crawford | |
| 6,650,404 B1 | 11/2003 | Crawford | |
| 2002/0036765 A1 * | 3/2002 | McCaffrey et al. ......... 356/5.08 |
| 2004/0061041 A1 * | 4/2004 | Ben-Ari et al. .......... 250/203.1 |
| 2005/0275830 A1 * | 12/2005 | Ohtomo et al. .......... 356/141.1 |

OTHER PUBLICATIONS

SeeSPOT III brochure, 2001, 2pp, FLIR Systems Inc., Wilsonville, OR 97070 USA.
Joint Pub 3-09.1, Joint Tactics, Techniques, and Procedures for Laser Designation Operations, May 28, 1999, 149pp, US Joint Chiefs of Staff.
Model 741DP Quadrant Tracking Detector/Processor, Aug. 2005, 2pp, Analog Modules Inc., Longwood, FL, USA.

* cited by examiner

*Primary Examiner*—Thomas H Tarcza
*Assistant Examiner*—Luke D Ratcliffe
(74) *Attorney, Agent, or Firm*—Gerald E Linden; Dwight A. Stauffer

(57) ABSTRACT

A laser spot tracker device comprising a laser tracker receiver using a quadrant detector incorporated into a pair of binoculars or optical telescope system with a crosshair or reticule. Directional information from the laser tracker receiver is displayed to an operator (JTAC) to allow the reticule to be manually steered on to the target illuminated by the laser, thus identifying the target to the spotter. The laser code may be pre-selected to track a particular designator, or, the tracker may read out the code or codes of laser spots within its field of view.

17 Claims, 3 Drawing Sheets

LASER SPOT TRACKER AND TARGET IDENTIFIER

CROSS-REFERENCE TO RELATED APPLICATIONS

This is a non-provisional filing of provisional No. 60/688,962 filed Jun. 9, 2005.

TECHNICAL FIELD OF THE INVENTION

The invention relates generally to laser-guided weapon (LGW) systems and, more particularly, to optical receivers for LGW systems.

BACKGROUND OF THE INVENTION

Laser-guided munitions (generally referred to as laser-guided bombs (LGBs) or laser-guided weapons (LGWs)) use a laser designator to mark (illuminate, "paint") a target. The reflected laser light ("sparkle") from the target is then detected by the seeker head of the weapon, which sends signals to the weapon's control surfaces (fins) to guide it toward the designated point. The illuminating laser light is encoded, and the laser receiver in the LGW is set to react only to reflected laser light having the proper code.

An extensive discussion of laser designation techniques and procedures may be found in *Joint Pub* 3-09.1 *Joint Tactics, Techniques, and Procedures for Laser Designation Operations*, 28 May 1999, incorporated in its entirety by reference herein.

The earliest laser guidance seekers measured the intensity of the reflected laser light at four corners of the seeker window. (Normally, seekers use angle of incidence and when on axis, the focused spot hits the quadrant center, off axis, the spot moves to one quadrant.) The seeker then actuated the weapon's control fins to steer the weapon in the direction of the strongest signal return, thereby keeping the weapon centered on the laser sparkle. Later weapons have more sensitive seekers and more sophisticated control systems that waste less energy with course corrections, improving accuracy and range, but the principle remains essentially the same.

While LGWs are highly accurate under ideal conditions, they present a number of challenges to be used successfully, making them somewhat less than the "silver bullet" sometimes suggested. The first problem is designation. To insure accurate guidance, the target must be illuminated for several seconds before launch, allowing the weapon's seeker to obtain a positive lock, and the target must remain illuminated during much of the weapon's transit time. If the designator's "sparkle" is turned off, blocked, or moved, the weapon's accuracy will be greatly reduced. Laser designation is also very vulnerable to weather conditions. Cloud cover, rain, and smoke frequently make reliable designation impossible. One patent describing a technique for attempting to validate the target is U.S. Pat. No. 5,350,134.

In the 1970s and 1980s it was common for aircraft to depend on a separate designator, either carried by ground forces, operated by the forward air controller, or carried by another aircraft in the strike group. It was often deemed more practical for one aircraft to provide lasing (perform designating) for its comrades. Modern conflicts and a growing emphasis on precision-guided weapons have pointed to the need for autonomous designation, and many fighter-bomber aircraft are now being fitted with designator pods to self-designate for laser-guided munitions.

One problem with LGWs is that there may be false returns from other than the desired target, such as from a nearby sand dune or vehicle. And, in some cases, mistakes are made and the wrong target can be attacked with potentially severe consequences.

It is known to have a spotter confirm that the correct target has been designated. SeeSPOT III, made by FLIR Systems Inc. (Wilsonville, Oreg. 97070 USA), is a hand held thermal and laser spot imager which uses reflected thermal energy from the laser to display like a video camera and display. It has very short range and because it essentially collects and integrates the light from the scene, it cannot decode the pulse timing. The laser spot is essentially seen as part of the scene and the spot has to compete with the background for visibility.

FIG. 1 illustrates an exemplary procedure for aircraft with laser-guided weapons (LGWs) and laser spot trackers, as set forth in *Joint Pub* 3-09.1, *Joint Tactics, Techniques, and Procedures for Laser Designation Operations*, 28 May 1999, incorporated in its entirety by reference herein, at page B-B-2.

In this scenario 100, an aircraft 102 is equipped with a LGW 104 which is shown already in its ballistic trajectory towards a target 106. Also illustrated is a forward air controller (FAC) 108, and a laser designator operator (LDO) 110. The FAC 108 is in radio communication with the pilot of the aircraft 102 and with the LDO 110. The LDO 110 illuminates the target 106 with a laser, and laser light is reflected back, typically as scattered reflections called "sparkle".

Generally, the sequence of events is that the maneuver unit commander (not shown) decides to request close air support. The FAC coordinates laser code, laser target line and frequency and/or call sign of the LDO. The airstrike request includes laser-related data. An airstrike approval message is received, the FAC coordinates marking and air defense suppression. The aircraft is dispatched to a contact point to check in with FAC. The FAC coordinates laser code, laser-target line and frequency and/or call sign with LDO and pilot. Approaching the target, the aircraft calls in. The FAC relays laser control calls. The LDO designates the target (by illuminating it with laser beam). The aircraft acquires the target or releases the LGW. The LGW heads towards the target, adjusting its trajectory based on sparkle from the laser-illuminated target. The target is destroyed.

The situation, as described above, may vary, depending on the type of LGW used. Generally, LGWs home in on reflected laser energy to strike a target. Some LGWs require laser target illumination before launch or release and/or during the entire time of flight; some require illumination only during the terminal portion of flight. For example, designation delay can be used in HELLFIRE engagement when the missile is fired in a lock-on after launch (LOAL) mode. By delaying lasing (illumination of the target), the enemy has less time to react if they have laser warning receivers. In all LGW engagements, two-way communications greatly increase the chances of a successful engagement.

Laser designators can provide precision target marking for employment of air-to-surface and surface-to-surface LGWs. Precise target marking with laser designators is directly related to target size and aspect, laser-beam divergence, designation range, and atmospheric attenuation of the beam. Preferably, aircrews must always acquire targets visually. However, ground LDOs normally have more powerful optics to acquire targets, more time, and lower task loading than do aircrews of fighter or attack aircraft. The LDO may be either on the ground or airborne.

Laser illumination of a target requires an unobstructed line-of-of sight path between the laser designator and the target. In some cases, redundant laser designation is employed. This is a technique employing two or more laser designators in different locations but on the same code to designate a single target for a single LGW. For example, in the case of moving targets (such as a tank), using two designators may preclude a guidance failure as a result of temporary (line of sight) blockage (such as from intervening structures).

After illumination of the target, the aircrew must maneuver the aircraft to acquire the laser designator's energy using a laser spot tracker (LST). A visible mark may also be necessary to help the aircrew align the seeker.

Laser Codes

The aforementioned *Joint Pub* 3-09.1, *Joint Tactics, Techniques, and Procedures for Laser Designation Operations*, 28 May 1999, Chapter IV, incorporated in its entirety by reference herein, describes the laser codes. The following is extracted/edited therefrom.

Laser designators and seekers use a pulse coding system to ensure that a specific seeker and designator combination work in harmony. By setting the same code in both the designator and the seeker, the seeker will track only the energy with the correct coding. The seeker will track the first correctly coded, significant laser energy it sees. The seeker will always lock on to the most powerful return in its view. The pulse coding used by all systems discussed in this manual is based on pulse repetition frequency (PRF). (Laser codes are normally simple PRFs in the 10 to 20 Hertz range.)

The designator and seeker pulse codes use a modified octal system that uses the numerical digits "1" through "8." The codes are directly correlated to a specific PRF (pulse repetition frequency), but the code itself is not the PRF and therefore can be communicated in the clear as required. Depending on the laser equipment, either a three- or four-digit code can be set. Three-digit code equipment settings range from 111 to 788. Four-digit code equipment settings range from 1111 to 1788. The three-and four-digit code equipment is compatible, and any mix of equipment can be used in all types of laser operations. However, when using a mix of three- and four-digit code equipment, all personnel must understand that the first digit of a four-digit code is always set to numerical digit "1". The remaining three digits will be set to match the three digits of the three-digit code equipment. As an example, a three-digit code of 657 would be set to 1657 on a four-digit code system or vice versa.

The lower the code number, the faster the laser pulse rate. The lower code number and faster pulse rate will give the seeker the most opportunity to acquire the target in the time available, and is appropriate for the most important targets and the most difficult operating conditions. However, lower code numbers cause faster battery drain.

Coding allows simultaneous or nearly simultaneous attacks on multiple targets by a single aircraft, or flights of aircraft, employing LGWs set on different codes. This tactic may be employed when several high-priority targets need to be attacked expeditiously and can be designated simultaneously by the supported unit(s).

Certain codes (low code, high PRF, and/or faster pulse rate) are preferred for laser systems requiring precision guidance. Codes must be prebriefed to both the FAC and aircrews for situations where communications cannot be established or authorized.

Laser coding can be used effectively and securely with LGBs (LGWs). LGB codes are set on the bombs before takeoff and cannot be changed in the air. The aircrew is told the code, but advance coding information might not be sent to the supported ground unit. When the aircraft is on-station, the aircrew passes the code to the FAC. When the use of an LDO is required, the FAC coordinates with the LDO to ensure that the laser designator is set on the same code as the LGBs.

Laser Spot Trackers

A laser spot tracker is a sensor that picks up coded laser energy from a laser designator and projects a symbol on a sight or heads up display. This symbol allows an operator to visually acquire the target designated by his or a friendly (LDO) laser. Most laser spot trackers are mounted on helicopters or fixed wing aircraft. It is believed that, at this time, there are no known ground-based systems with laser spot trackers, and it is believed that the only fixed wing aircraft with both a laser designator and a laser spot tracker are Navy F-18s and USAF fighters equipped with the Lightning II targeting pod, and European planes, Jaguar, Harrier and MRCA using the LRMTS (Laser Ranger and Marked Target Seeker) system. While the OH-58D, SH-60B, and HH-60H do not have laser spot trackers, pilots can see a laser spot if they are carrying a Hellfire Missile due to the missile seeker head cuing in their weapons display.

Some Patents of Interest

U.S. Pat. No. 5,350,134, incorporated in its entirety by reference herein, discloses target identification systems. A target identification system includes a target marker for selecting, and directing radiation at, a target, a weapon delivery system, and means for establishing a two-way communication channel between the two by reflection from a selected target. The communication is by infra-red laser and coded information is sent between the target marker and the weapon delivery system to identify the selected target.

U.S. Pat. No. 5,311,353, incorporated in its entirety by reference herein, discloses wide dynamic range optical receivers. A wide-dynamic range optical receiver amplifier is provided by using two separate amplifiers. The first amplifier is a low-impedance input, low-noise, high-gain amplifier, preferably a transresistance amplifier. An input resistor is chosen for the amplifier such that its resistance value is much greater than the input impedance of the first amplifier, resulting in insignificant change in input impedance when the first amplifier's output becomes saturated. A light-induced signal source is connected to the input resistor such that signal current from the light-induced signal source flows through the input resistor into the first amplifier input. A second high-input-impedance amplifier (preferably an FET-input buffer amp) is connected to receive the light induced signal source, either directly or through a resistive divider network. The difference in gain between the two amplifiers serves to extend the dynamic range of the optical receiver amplifier without switching input or feedback components, and without discontinuous response as the first amplifier becomes saturated. Other embodiments are directed to a further diode induced breakpoint, and to a front-end for a spot tracking system. As further disclosed therein, Optical receivers (or opto-receivers) measure light used in various applications such as atmospheric studies, laser rangefinding, and spot tracking. In many applications it is desirable to utilize the value of light flux over a wide dynamic range. For example, a target-tracking (spot-tracking) device may provide directional information to a target by means of splitting a focused light spot reflected off of a target between four quadrants of a multi-sector photodetector. The distribution of light between the four quadrants of the photodetector provides an indication of how far "off-center" the detector is aimed. The light flux varies over a wide dynamic range as the tracker approaches the target, yet measurements must be taken.

FIG. 3a is a block diagram of a front end 300 for a spot tracking system utilizing wide dynamic range optical receivers of the type described hereinabove (e.g., 100, 200). In a spot-tracking system, a bright spot of light, e.g., a laser-generated spot, is focused on a target. Reflected light 305 from the target is imaged by an optical system 310 (e.g., a lens) onto a multi-sector photodetector 312 (described hereinbelow with respect to FIG. 3b). Signals from the multi-sector photodetector 312 are amplified by opto-receiver electronics 314 to provide a number (four shown) of sector (quadrant) output signals 316a, 316b, 316c, and 316d. In a spot tracking system, these signals are used to determine the position of the target relative to the orientation of the photodetector 312, and to provide guidance or steering signals to "aim" the photodetector 312 (or the device upon which it is mounted) more accurately towards the spot on the target.

FIG. 3b is a view of a four-quadrant multi-sector photodiode assembly 312 for use in a spot-tracking system such as that described with respect to FIG. 3a. The photodiode assembly 312 has an array of four distinct photosensitive areas (quadrants or sectors) 320a, 320b, 320c, and 320d. Each sector 320a, 320b, 320c, and 320d, has a first electrical connection 318a, 318b, 318c, and 318d, respectively. Second electrical connections to the each of the photo-sensitive areas are connected in common and provided as a single electrical connection 318e. The sensitive areas 320a, 320b, 320c, and 320d operate independently as separate photodiodes, each responding only to light impinging thereupon. Dashed line 305a indicates the effect of a perfectly centered spot illuminating each of the sensitive areas 320a, 320b, 320c, and 320d, equally.

It will readily be appreciated by one of ordinary skill in the art that although the four-quadrant photodiode assembly 312 shows four diodes connected in a common-cathode configuration, that multi-sector photo-diode assemblies can also be fabricated in a common-anode configuration, as discrete sector diodes, and with any number of sensitive areas. It is within the scope and spirit of the present invention to adapt any such single or multi-sector configuration of photodiodes for use with opto-receivers of the type described hereinabove with respect to FIGS. 1 and 2.

FIG. 3c is a schematic representation of the four quadrant photodiode 312 of FIG. 3b, wherein the four sensitive areas 320a, 320b, 320c, and 320d are represented graphically as four separate photodiodes with a common connection (318e).

FIG. 3d is a block diagram of a four-quadrant optical receiver system for use with a spot tracking system, according to the invention. (This figure corresponds roughly to the combination of 312 and 314 as described with respect to FIG. 3a.) In the figure, a four quadrant photodiode assembly is connected such that one sensitive area 320a, 320b, 320c, and 320d is connected to each of four opto-receivers 314a, 314b, 314c, and 314d, respectively. These opto-receivers 314a, 314b, 314c, and 314d are built according to the present inventive technique (e.g., 100—FIG. 1, or 200—FIG. 2).

While FIGS. 3a-d describe a "front-end" for a spot tracking system using a four-quadrant photodetector (the four quadrant photodiode 312), it will be readily appreciated by one of ordinary skill in the art that similar spot tracking systems are possible utilizing multi-sector detectors with two or more sensitive areas and a like number of opto-receiver amplifiers of the type described hereinabove. Where only linear tracking (one dimensional, e.g., up-down or left-right) is required, a "two-channel" system may be constructed using a two-sector photodetector and two opto-receiver amplifiers (e.g., 100—FIG. 1 or 200—FIG. 2). A two dimensional (i.e., "X" and "Y") spot tracking system can be constructed using a multi-sector photo-detector having three or more non-collinear sensitive areas and a like number of opto-receiver amplifiers.

It will also be readily appreciated by one of ordinary skill in the art that the photoconductive detectors described hereinabove (e.g., 101, 201, 312) may be provided by photodiodes (e.g. PIN diodes), phototransistors, or any other suitable photodetector device and that with an appropriate reversal of polarities, the principles of the present invention may be readily applied to negatively referenced or ground-referenced photodetectors. Accordingly, it should be recognized that the circuits described hereinabove are merely exemplary of physical configurations of this type and should not be considered as limiting the scope of the invention.

As further disclosed therein, the following patents generally disclose detecting and/or measuring light, especially laser light: U.S. Pat. No. 4,792,230 (measuring ultra-short optical pulses); U.S. Pat. No. 4,721,385 (FM-CW laser radar system); U.S. Pat. No. 4,830,486 (frequency modulated laser radar); U.S. Pat. No. 4,856,893 (which discloses both CW and pulse lasers, as well as range measurement); U.S. Pat. Nos. 4,812,035 and 4,846,571 (AM-FM laser radar).

Commonly-owned U.S. Pat. No. 6,650,404, incorporated in its entirety by reference herein, discloses laser rangefinder receiver. In a laser rangefinder receiver, a return signal from a light-sensitive detector is passed through a high-pass filter, and is then processed in two separate circuit paths, a "signal" path and a "noise" path. The "signal" path employs a time-variable offset scheme to control receiver sensitivity. The "noise" path measures noise in the return signal, and maintain a noise-based threshold independent of the time-variable sensitivity of the "signal" path. No interstage coupling capacitors are employed, which contributes greatly to the receiver's quick saturation recovery. As further disclosed therein, Laser rangefinders are well known, and are used to measure distances to targets. Generally, a laser transmitter is used to beam a high intensity pulse of light onto a selected target. The light scattered from (echoed or reflected off of) the target is detected by an optical receiver (or "opto-receiver") which is normally located in close proximity to the laser transmitter. By measuring the transit time (time-of-flight) between a transmitted laser pulse and the received echo, the range (distance) to the target can be determined using a time-interval counter.

GLOSSARY & DEFINITIONS

Unless otherwise noted, or as may be evident from the context of their usage, any terms, abbreviations, acronyms or scientific symbols and notations used herein are to be given their ordinary meaning in the technical discipline to which the disclosure most nearly pertains. The following terms, abbreviations and acronyms may be used throughout the descriptions presented herein and should generally be given the following meaning unless contradicted or elaborated upon by other descriptions set forth herein. Some of the terms set forth below may be registered trademarks (®).

A-D short for analog-to-digital. An analog-to-digital converter (abbreviated ADC, A/D or A to D) is an electronic circuit that converts continuous signals to discrete digital numbers. The reverse operation is performed by a digital-to-analog converter (DAC).

APD short for avalanche photodiode. An APD is a specialized silicon PIN photodiode with internal gain. APDs are designed to operate with high reverse-bias voltages that cause the electron-hole pairs generated at the P-N junction to gain sufficient energy to create additional pairs, and so forth. This effect is known as avalanche multiplication.

azimuth generally indicating a horizontal (side to side, left or right) direction, such as in what direction a star (or laser-designated target) is located, from a reference point such as straight ahead.

comparator In electronics, a comparator is a device which compares two voltages or currents, and switches its output to indicate which is larger. More generally, the term is also used to refer to a device that compares two items of data.

DC short for direct current. DC is electrical current that flows in one direction, such as from a normal flashlight battery. It's counterpart, AC (alternating current) is current that alternately flows in one direction, than the other direction, such as normal household current.

elevation generally indicating a vertical (up and down) direction, such as how high a star (or laser-designated target) is positioned in the sky from a reference point such as the horizon.

gain In electronics, gain is usually taken as the mean ratio of the signal output of a system to the signal input of the system. A gain of five would imply that either the voltage or power is increased by a factor of five. It has wide application in amplifiers.

laser A LASER (Light Amplification by Stimulated Emission of Radiation) is an optical source that emits photons in a coherent beam. Laser light is typically near-monochromatic, i.e. consisting of a single wavelength or hue (color), and emitted in a narrow beam. This is in contrast to common light sources, such as the incandescent or fluorescent light bulb, which emit incoherent photons in almost all directions, usually over a wide spectrum of wavelengths.

LGW short for laser-guided weapon. Also referred to as laser-guided bomb (LGB). Generally, LGW is any ordinance that homes in on its target by sensing laser light reflected from a designated target. The target is illuminated by a "designator". The weapon typically has a "tracker" to sense the direction from which the laser light is being reflected (nominally, the target). Typically, the LGW is delivered by an aircraft. The designator may be in the same aircraft as the aircraft delivering the weapon, or the designator may be in another aircraft, or the designator may be on the ground. The laser light (beam) is typically modulated with codes to distinguish it from other lasers that may be illuminating other targets. The codes are coordinated between the tracker (weapon, aircraft delivering the weapon) and the designator.

modulation Generally, modulation is the process of varying a signal in order to use that signal to convey information. For example, a laser light beam can be modulated to have a characteristic (code) that is different from other seemingly-similar laser light beams.

photodiode A photodiode is a semiconductor diode that functions as a photodetector. Photodiodes are packaged with either a window or optical fiber connection, in order to let in the light to the sensitive part of the device. They may also be used without a window to detect vacuum UV or X-rays.

PIN short for positive-intrinsic-negative. A PIN photodiode is a silicon photodiode with a high-resistance intrinsic area between the P and N layers, thus the name positive-intrinsic-negative photodiode.

quadrant A quadrant refers to a sector which is one quarter of a circle—like cutting a pie into four pieces.

RMS short for root mean squared. RMS is a mathematical, statistical measure of the magnitude of a varying quantity.

sensitivity The sensitivity of an electronic device, e.g., a communications system receiver, or detection device, e.g., PIN diode, is the minimum magnitude of input signal required to produce a specified output signal having a specified signal-to-noise ratio, or other specified criteria.

wavelength The wavelength is the distance between repeating units of a wave pattern. It is commonly designated by the Greek letter lambda ($\lambda$). In a sine wave, the wavelength is the distance between the midpoints of the wave—like the distance between ripples on a pond when you throw a rock in. Wavelength is related to frequency—the higher the frequency, the shorter the wavelength. Light has a very high frequency and a very short wavelength. Radio waves have a lower frequency than light, and a longer wavelength than light. Sounds have a much lower frequency than radio waves, and a much longer wavelength. The wavelength of light is often measured in microns (um, or millionths of a meter) or angstroms (Å, a ten thousandth of a millionth of a meter).

BRIEF DESCRIPTION (SUMMARY) OF THE INVENTION

Generally, the invention is directed to a laser spot tracker device comprising a laser tracker receiver using a quadrant detector incorporated into a pair of binoculars or optical telescope system with a crosshair or reticle. Directional information from the laser tracker receiver is displayed to allow the reticle to be manually steered on to the target illuminated by the laser, thus identifying the target to the spotter. The laser code may be pre-selected to track a particular designator, or, the tracker may read out the code or codes of laser spots within its field of view.

An operator (JTAC) using the laser spot tracker (referred to herein as "SPOTTR") is able to view the laser designator PRF Code to confirm that the correct designator is illuminating the correct target and "clear hot" ordinance to be dropped. If the correct target is not illuminated the JTAC can give commands to the laser designator operator (LDO) to shift the laser spot to the correct target. Combat capability may thereby be increased by reducing the time for target confirmation and talk-ons, thereby speeding up the targeting process and minimizing targeting errors that can result in fratricide or collateral damage.

According to an embodiment of the invention, a method of verifying that a target is being illuminated by a laser comprises: viewing the target through a composite device comprising an optical portion having a field of view (FOV) for viewing the target in a target area, and a opto-receiver portion for detecting reflected laser light; and generating and displaying information about the received laser light in the field of view, along with an image of the target in the target area.

Generally, the method comprises centering the target in a reticle in a field of view of the optical portion of the composite device and displaying direction of the reflected laser light from the target in the field of view.

The display may include indicia indicating distance and direction of the laser spot from the target.

The indicia may be in the form of a set of inner quadrant arcs, and illuminating appropriate ones of the inner arcs when the reflected laser light close to the center of the field of view (FOV), and a set of outer quadrant arcs, and illuminating appropriate ones of the outer arcs when the reflected laser light is far from the center of the field of view (FOV).

The intensity (signal strength) of the reflected laser light may be displayed (using an appropriate indicator).

The code of the laser light may (generally, should) be displayed.

Multiple lasers (designators) may be tracked in the field of view, and means may be provided for toggling through the designators.

In a first mode of operation, only information that matches a given laser code may be output (displayed). In a second mode of operation, information that matches any allowed code description may be output (displayed), and the user can select a code description, after which only information matching the selected code is output.

According to an embodiment of the invention, a method of coordinating delivery of a laser guided weapon (LGW) to a target comprises: illuminating a desired target with laser emitting laser light; observing whether the laser is on-target by combining a visual image of the target with a display of information about the laser light, the information comprising at least direction from target and distance from target; if it is determined that the laser is on target, clearing an aircraft to deliver ordnance to the target; and if it is determined that laser is not on target, re-aiming the laser based on the displayed distance and direction from the target. The display of information about the laser light may comprise laser code and signal strength.

According to an embodiment of the invention, apparatus for viewing a target and determining a direction and distance of a spot of reflected laser light from the target comprises: a visual system comprising viewing optics for viewing a scene which contains the target; an electronic system collecting the reflected laser light with a segmented detector capable of sensing the angle of the spot of incoming laser light; means for generating information pertaining to a distance and direction of the spot from the target; and display means for superimposing the information onto the view of the scene which contains the target. The display means may indicate a direction to move to a null, which is boresighted with a reticule in the viewing optics to superimpose crosshairs onto and therefore identify the far-field target from which the laser radiation is coming.

The apparatus may comprise separate detection of signal compared to noise in each channel, optionally including a sum channel.

The apparatus may comprise means for providing serial or parallel data to output of any or all of: signal level per quadrant; arc position data, code data; gain range; multiple target information and gain data.

The apparatus may comprise an added night sight boresighted with the laser detector null direction.

The apparatus may comprise a laser receiver telescope and detector mounted on a stabilized gimbal.

The apparatus may comprise a collection lens/mirror and detector fixed and a moving optical element between the laser light collection means and the detector means to stabilize the laser sightline from external vibration or short-term movement.

The apparatus may comprise a laser telescope unstabilized, used with either a stabilized or unstabilized optical sight.

The apparatus may be in the form of a binocular, with one visual optical system and one laser receiver optical system.

The apparatus may comprise a laser rangefinder boresighted to the null position in order to get range information to the target.

The apparatus may comprise integrating a laser rangefinder receiver with the segmented detector position sensitive receiver using a common detector for time of flight measurement and directional measurement.

The apparatus may comprise a laser designator boresighted with the null position to allow for hand-off of the designation function after target confirmation.

The apparatus may comprise display of directional and/or other information superimposed or projected onto the visual display so that may be simultaneously viewed.

Other objects, features and advantages of the invention will become apparent in light of the following description(s) thereof.

BRIEF DESCRIPTION OF THE DRAWINGS

The structure, operation, and advantages of the present preferred embodiment of the invention will become further apparent upon consideration of the descriptions set forth herein, taken in conjunction with the accompanying figures (FIGS). The figures (FIGS) are intended to be illustrative, not limiting. Although the invention is generally described in the context of these preferred embodiments, it should be understood that it is not intended to limit the scope of the invention to these particular embodiments.

DETAILED DESCRIPTION OF THE INVENTION

The invention is generally directed to a device (Stabilized Portable Optical Target Tracking Receiver; referred to herein as "SPOTTR") for spotting reflections from lasers illuminating targets, including decoding and displaying laser codes, and to deploying the device in a battlefield scenario.

Figure 1:
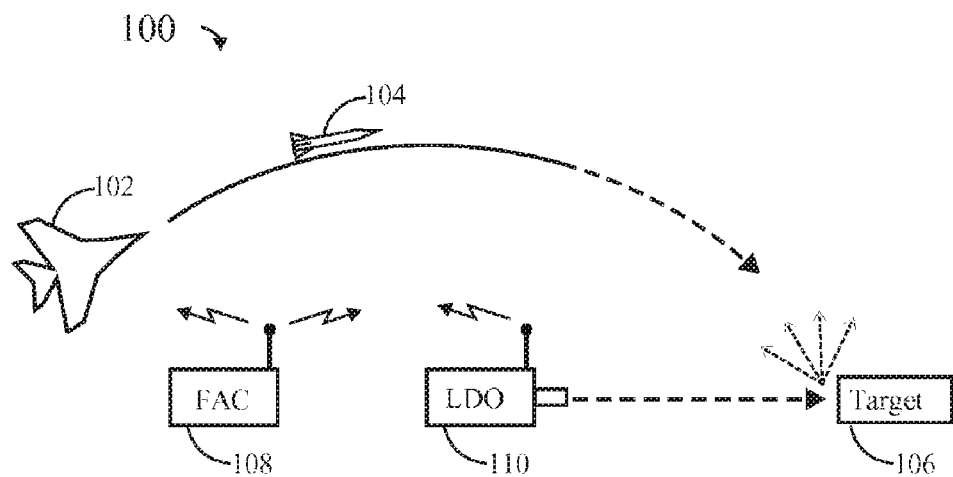
FIG. 1 is a diagram of a battlefield scenario involving a LGW, according to the prior art.
Figure 2:
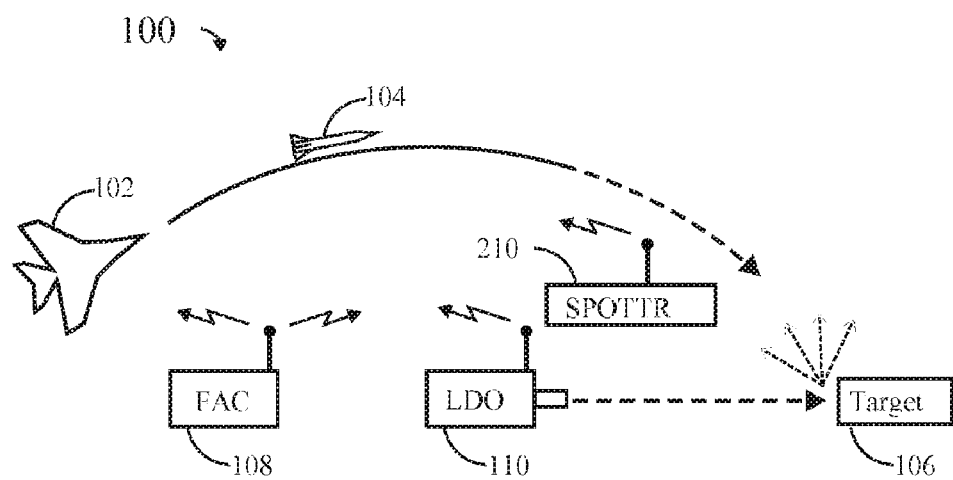
FIG. 2 is a diagram of a battlefield scenario involving a LGW, according to the invention.

FIG. 2 shows a target tracking receiver 210 deployed in the battlefield scenario 100 of FIG. 1.

The target tracking receiver (SPOTTR) 210 can provide accurate stand-off verification of target illumination by airborne or ground laser designators (110). This object may be achieved by use of a Stabilized Portable Optical Target Tracking Receiver (SPOTTR).

SPOTTR is designed to allow an operator (Joint Terminal Attack Controller (JTAC)) on the ground near the target area, to detect and decode laser energy from an airborne or ground laser designating military targets. SPOTTR greatly increases the assurance that ordinance will be delivered to the intended target, critical when friendly forces are nearby in a close air support environment.

The JTAC (using SPOTTR) is able to view the laser designator PRF Code to confirm that the correct designator is illuminating the correct target and "clear hot" ordinance to be dropped. If the correct target is not illuminated the JTAC can give commands to shift the laser spot to the correct target. Combat capability is increased by reducing the time for target confirmation and talk-ons, thereby speeding up the targeting process and minimizing targeting errors that can result in fratricide or collateral damage.

Generally, SPOTTR comprises a laser tracker receiver using a quadrant detector (such as disclosed in U.S. Pat. No. 5,311,353) incorporated into a pair of binoculars or optical telescope system with a crosshair or reticle. Directional information from the laser tracker receiver is displayed to allow the reticle to be manually steered on to the target illuminated by the laser, thus identifying the target to the spotter. The laser code may be pre-selected to track a particular designator, or, the tracker may read out the code or codes of laser spots within its field of view.

SPOTTR is a "composite" device combining (i) an optical system for viewing a target and (ii) an opto-receiver system detecting reflected laser light. The two systems are integrated together, and a display presents information about the detected laser light to the operator (JTAC), preferably in the same field of view (FOV) as his visual image of the target.

The display image can be combined (superimposed) with the visual image in a conventional manner using beamsplitters or the like to get two images into one field of view. Or, in a binocular device, one side can be opto-receiver display, and the other side can be optical view. In other words, the field of view (FOV) is shared by optical image, and electronic display, using any suitable means such as beamsplitter, aperture sharing, and the like.

Generally, using SPOTTR, the operator (JTAC) visually acquires what he believes to be (and is supposed to be) the target. To start off with, he would put the candidate target in the crosshairs of the reticle, in the center of his field of view (FOV). (The field of view is an optical image of the target area.) Then, by observing indications on the display, the operator can determine whether the laser designator is on-target, or off-target. If the laser is off target, the operator (JTAC) can communicate this situation to the designator operator (LDO). Steering commands projected by the display into the field of view (FOV) direct the operator (JTAC) to move the crosshair (re-aim his binocular) to the detected laser spot location. Sets of visual indications ("indicia"), such as illuminated arcs in each quadrant near the perimeter and center of the field of view provide these steering commands, which are essentially right, left, up and down, as well as distance information (close to, far from). All four inner arcs will stay lit when the crosshair is centered on the target.

If the laser is not "on target", the operator (JTAC) can direct the pilot (or LDO) to shift the laser spot (in other words, redirect aiming of the laser) using cardinal directions (N., S., E., W.) and distance (such as in meters) to the target (aircraft targeting pods have North arrows and meter sticks on displays).

With SPOTTR, lengthy and sometimes confusing JTAC-to-fighter and fighter-to-JTAC "target talk-ons" are greatly reduced and fratricide potential is virtually eliminated since the JTAC has direct confirmation of the aircraft's designator target location.

SPOTTR is capable of tracking three or more designators in its field of view. The PRF Codes are displayed in the viewfinder and decimal points indicate how many lasers SPOTTR is tracking. The JTAC can toggle through the designators selecting the code of the aircraft he is directing.

The primary users are JTACs assigned to Air Support Operation Squadrons attached to Army Brigades/Divisions. However, the SPOTTR tracking capability could also be employed by Special Forces, Marine JTACs and in aircraft.

The illuminated arcs provide somewhat coarse indications of where the laser light is being reflected from, relative to the center of the FOV (cross hairs of the reticle). Although, with two sets of illuminated arcs, one set (306) for "far" and one set for "near", the operator is provided with very ergonomic information which he can react quickly to (in cases where the laser is not on-target), to ascertain what has been illuminated by the laser, and quickly communicate the situation to the LDO operator.

Generally, using a quadrant detector, the display indicates only which quadrant the laser light is coming from (including at the junction of two quadrants), and some information about how far from the center of the FOV the reflected laser light is coming from. With segmented detectors having greater resolution than a quadrant detector, the display may also (or alternatively) indicate to the operator where the laser light is being reflected from, such as by displaying a symbol (such as a small flashing square) to the operator corresponding to the segment at the detected location of the reflected laser light. Generally, if the laser is so far off target that it is not in the field of view, no meaningful information will be presented to the operator.

A numeric display indicates the laser's PRF Code, the number of designators in the field of view, and signal strength. SPOTTR may track the first three designators it detects operating in its field of view. The number of designators is shown in the eyepiece by decimal points in the code display. The JTAC can toggle between the three designator codes being simultaneously tracked by SPOTTR.

SPOTTR incorporates Gyro-Stabilization, which helps to remove the effects of hand and vehicle vibration. This allows for clearer and easier target identification at long ranges. SPOTTR also serves as a 12× monocular with night vision capability.

SPOTTR incorporates a quadrant tracker developed by Analog Modules, Inc. (Longwood, Fla.) into a widely deployed General Services Administration (GSA) listed M-25 gyro-stabilized binocular manufactured by Fraser-Volpe LLC. The left ocular is replaced with the quadrant tracker to acquire reflected energy from laser designators. Steering information is then projected into the field of view to guide the user to the exact location of the laser spot. The miniature quadrant tracker is mounted on the gyro-stabilized gimbal so that the tracker's sightline is stabilized and remains boresighted to a cross hair in the binocular's right eyepiece. Spot location and the designator's PRF Code are displayed in the user's sight picture. The quadrant tracker is based on the 741DP with the digital processing modified to interface with the SPOTTR display requirements.

Figure 3:
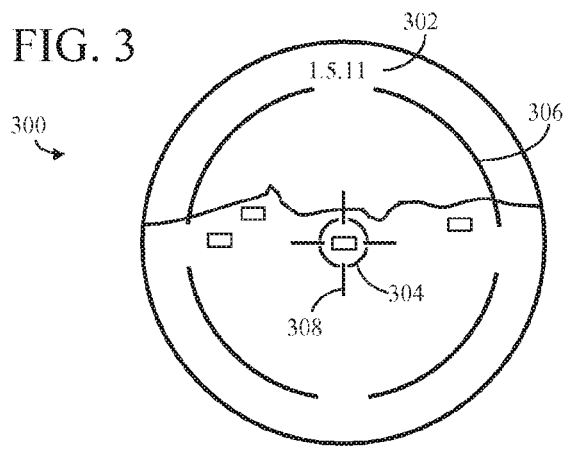
FIG. 3 is a diagram of a view through an optical target tracking receiver, according to the invention.

FIG. 3 shows a view through SPOTTR. This is what the operator (JTAC) would see when looking through the binocular (composite device). For example, as illustrated in FIG. 3, 302 Designator's PRF Code. Decimals Indicate number of Designators in Field of View.

PRF code 302 (displaying 1.5.11). The display may be set up to multiplex between displaying PRF code and an indication (such as bars, as in cell phone displays) of signal strength.

inner arcs 304 (one per quadrant) and outer arcs 306 (one per quadrant) which light up indicating which quadrant (direction) in the field of view the reflected laser spot is detected as being in, as well as its distance from center of the FOV. When on target (FIG. 3D) all four inner arcs 304 light up.

reticule 308. Optionally, a boresighted reticule can be projected into the visual path, or a simple fixed reticule at the eyepiece focal plane as long as the laser receiver and visual optics are similarly stabilized.

The inner arcs 304 and outer arcs 306 are examples of information that is generated by SPOTTER 210 and displayed to the operator (user, JTAC). The integration of visual image of a relevant portion of the battlefield (containing the target) with information about the laser designator being displayed provides JTAC with meaningful information in a very convenient manner to confirm (and clear, or correct, as necessary) targeting.

Figure 3A:
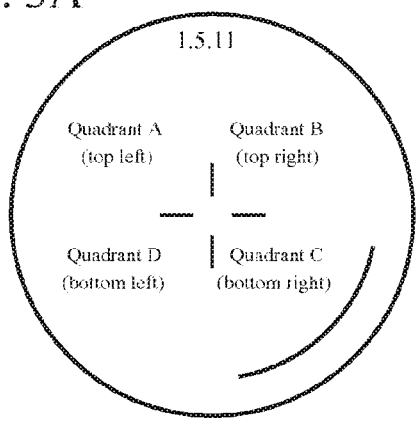
FIGS. 3A-3D are diagrams of the view through the optical target tracking receiver of FIG. 3, under four different circumstances, according to the invention.

FIG. 3A illustrates the view when the spot (reflected laser light) is in the low right quadrant (D), and far from the target. As used herein, "far from" the target may be greater than approximately 10% of the FOV from center. (Alternatively, the threshold for "far from" can be set to be greater than 5%, 20%, 25% and the corollary "close to" would be within (less than or equal to) those thresholds.)

FIG. 3A is also labeled with quadrant designation (A, for top left, 9-12 o'clock; B, for top right, 12-3 o'clock; C, for bottom right, 3-6 o'clock; D, for bottom left, 6-9 o'clock), but these are just labels (legends) in the drawing, and are not displayed to the operator. What the operator (JTAC) will see is an image of the target area, the reticule, and information about the laser light being displayed in the image of his field of view by the electronics.

Figure 3B:
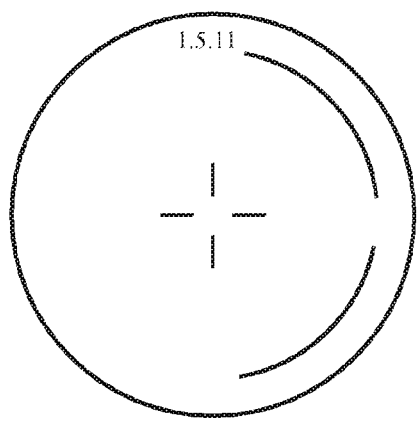

FIG. 3B illustrates the view when the spot is directly to the right, and far from the target. Two outer arcs 306 are illuminated, in the B and C quadrants, indicating that the laser spot is at the junction of quadrants B and C (so, it is generally at the 3 o'clock position relative to the target), and inasmuch as it is the outer, not the inner arcs that are illuminated indicates that the distance from the target is "far" (but within the field of view).

Figure 3C:
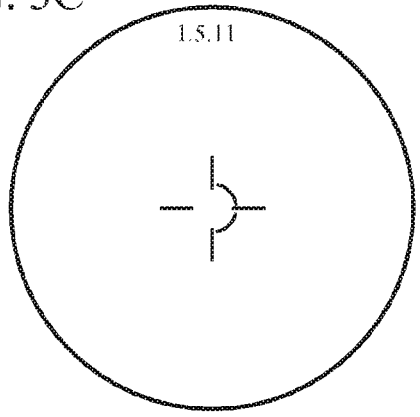

FIG. 3C illustrates the view when the spot is directly to the right, and close to the target. As used herein, "close to" the target may be defined as within (less or equal to) approximately 10% of the FOV from center. Two inner arcs 304 are illuminated, in the B and C quadrants, indicating that the laser spot is at the junction of quadrants B and C (so, it is generally at the 3 o'clock position relative to the target), and inasmuch as it is the inner, not the outer arcs that are illuminated indicates that the spot is close to the target. When the spot is (or becomes) yet closer to the target, a third inner arc may illuminate, and when the spot is on the target, all four inner arcs will illuminate (FIG. 3D).

Figure 3D:
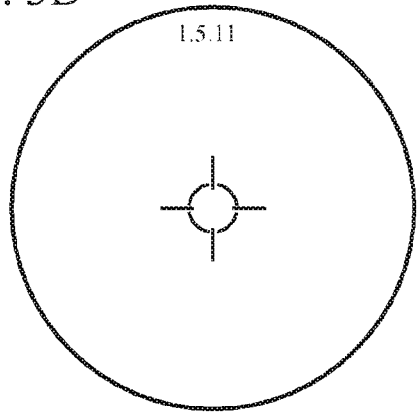

FIG. 3D illustrates the view when the spot is on target. All four inner arcs 304 are illuminated, and may be caused to flash to be more evident to the operator.

Generally, either one or two inner arcs 304 are lit up, indicating a direction from and close to target, or one or two outer arcs 306 are lit up, indicating a direction and far from target, or all four of the inner arcs 304 are lit up, indicating on target. It is also possible that 3 inner arcs 304 can light up, when the spot is very close to the target. It is generally not possible that 3 or 4 outer arcs 306 light up, because the spot is far from center and therefore could only be in one quadrant (one outer arc illuminated) or cross the junction between two quadrants (two outer arcs illuminated).

The aforementioned arcs 304, 306 are merely exemplary of "indicia" that can be used to indicate to the operator the direction and distance of the laser spot from the target. Any other suitable symbology may be used. Generally, this "analog" (symbols) approach is preferred, but digital information regarding direction and distance of the spot from the target could alternatively or additionally be displayed.

SeeSPOT III (described hereinabove) provides an image of the laser spot in the FOV. The laser spot is essentially seen as part of the scene and the spot has to compete with the background for visibility. The image is direct, not internally generated. In contrast thereto, SPOTTR generates indicia which are superimposed onto the FOV—steering information is projected with the scene image.

SPOTTR provides
Fast, Accurate Target Confirmation
Visual Laser Spot Locator
Identify Multiple Designators
Increase Combat Capability
Decrease Fratricide and Collateral Damage
Gyro-Stabilized Platform Prior to weapons delivery, SPOTTR allows a forward observer to provide positive identification of the target from a safe distance. Effective maximum detector range in clear weather is approximately 10 km in daylight and 17 km at night, allowing significant standoff distance. Visibility performance at night is limited to the optional night vision equipment being paired with the SPOTTR system.

Ground combat personnel (JTAC) pass target information and coordinates (map or GPS aided) to fighter/bomber aircraft using standard "9-line" format. The aircraft (or LDO) fires the laser at the target coordinates from a distance. The JTAC looks through the SPOTTR, identifies the aircraft's PRF Code, and determines if the aircraft is illuminating the correct target (the laser is "on target"). If so, the JTAC can "clear hot" the aircraft to drop laser guided bombs (LGBs) or employ other ordnance with greatly increased assurance that the pilot is on the correct target. This is especially important if friendly troops are nearby in a close air support (CAS) environment.

Exemplary specifications for SPOTTR are:
Magnification: 12×
Exit Pupil: 3 mm
Field of View: 4.3°
Resolution (Day): 4.3 Sec
Focus Adjustment: ±5 Diopters
Power (Internal): 4 Lithium 123 Camera Batteries
Power (External): 6-30 VDC
Length (Day): 8.25" (210 mm)
Length (Night): 9.0" (229 mm)
Width: 7.5" (190 mm)
Height: 3.5" (89 mm)
Weight (Day): 4.5 lbs (2.04 kg)
Weight (Night): 5.3 lbs (2.40 kg)

Typical Operational Sequence:
A patrol is taking fire from an enemy-occupied building in a civilian area.
JTAC wants fighter to drop single LGB on the building occupied by enemy combatants.
JTAC passes "9-line" format coordinates.
Fighter enters JTAC derived coordinates and sees several buildings in target area.
Fighter fires laser on a single building.
JTAC confirms SPOTTR is tracking the fighter's Octal (laser) Code.
JTAC confirms that the correct building is targeted by the fighter or JTAC provides directions to shift laser spot to the target building.
JTAC "clears hot" for fighter LGB attack.
The standard 9-line format is as follows:
1. Initial point (IP). A known position on the ground.
2. Heading from the IP to the target.
3. Distance from the IP to the target in nautical miles.

4. Target elevation in feet above mean sea level.
5. Target description.
6. Target location coordinates.
7. Type of mark, smoke, laser, etc.
8. Location of friendlies from the target, cardinal direction, and distance in meters.
9. Egress direction and/or control point after attack.

Problem/Solution Statement

As mentioned above, airborne and ground laser illuminator systems are used to designate targets of military significance. To minimize targeting errors resulting in collateral or inadvertent infrastructure damage, SPOTTR provides a method of visually verifying that the designated target is the proper one.

Effective maximum ranges for SPOTTR in clear weather are 10 Km (daytime) and 17 Km (night), allowing significant standoff distance for safety. SPOTTR is an integration of quadrant tracker electronics with existing field-proven stabilized binoculars, for example (NSN 1240-01-410-7418) manufactured by Fraser-Volpe Corporation.

Stabilized binoculars are used for target spotting. The stabilizer filters out vehicle and hand held motions, while allowing smooth low-frequency movements over the field of view.

Laser designators are used to paint (illuminate) a target, and there exists a need to verify the spot position, or use a laser designator as a pointer to identify objects.

The integration of quadrant tracker electronics with the binoculars can be achieved by removing the left binocular optical system and replacing it with a quadrant tracker that provides direction information displayed in the visual sight. This miniature quadrant tracker is mounted on the gyro-stabilized gimbal so that its sightline is stabilized against external vibration and is boresighted to a crosshair in the right eyepiece reticule. By moving the binocular in accordance with the displayed directions, the crosshair is nulled into the painted spot location. These steering instructions may be presented in the left eyepiece (no external visual path) or injected into the right eyepiece reticule against the view, with extra complexity.

A low-cost subminiature quadrant tracker can provide direction information, and can be adapted for display in the eyepiece of a binocular. A suitable quadrant tracker is available from Analog Modules, Inc. (Longwood, Fla., USA), part no. 741DP, described hereinbelow.

The display format and presentation are flexible, and dimming capability may be provided for good contrast in different light conditions. This may be achieved by duty cycle modulation and may be controlled manually. Further enhancements are possible by displaying the designator PRF band (10, 20 or single shot), and received signal strength by bar displays. The PRF code may also be decoded and displayed, and the presence of multiple targets within the field of view may be noted.

Optionally, Up/Down and Left/Right commands can be provided to a servoed platform upon which the binoculars are mounted to create a tracking mount for larger (than hand held) equipment. An optional infrared (IR) viewer eyepiece provides night vision capability.

The combination of visual observation of the desired target, combined with information about where the laser spot is being reflected from, provides for enhanced coordinated delivery of a laser guided weapon (LGW). The display of information related to the laser light being reflected (direction, distance from target, code), combined with a visual telescope with a reticule or crosshairs to identify the target, and local steering by feedback from this visual information to allows for confirmation of the target (and correction, if necessary) in a small portable package.

Quadrant Tracking Detectors and Processors

The 741DP is a new generation of laser spot tracker available from Analog Modules, Inc. (Longwood, Fla.). The 741DP has wide flexibility for missile and platform tracker applications. The detector is temperature controlled and optimized for 1.06 µm. Independent five channel noise detectors set the lowest thresholds to achieve long acquisition ranges for different background light and spot positions. Serial data output gives channel amplitudes.

Optical/Detector

A lens or mirror is used to collect the laser light (from the target designator) and focus it onto a segmented detector, such as a quadrant detector having four distinct (separate) sensing areas (for example, top left, top right, bottom right, bottom left), but other types are possible. Segmented detector of n segments where n>1, detector with inner and outer areas, various detector technologies-silicon PIN is the most common, but silicon APD, InGaAs PIN, InGaAs APD, and others are possible.

The detector suitably comprises APD detectors or PIN photodiode detectors. The APD has a high gain and gives more sensitivity (longer detection range), but is more expensive, needs a regulated high voltage bias, and is sensitive to background light. The PIN detector can have a larger field of view and in both cases, an optical narrowband filter is desirable to allow only the laser light of interest to be visible to the detector.

The most popular laser wavelength currently used for laser target designation is 1.06 µm (microns) with a silicon detector, but future developments may use 1.54 µm, in which case a detector of InGaAs (Indium gallium arsenide) photodiodes may be most suitable.

There is a visual telescope with a reticule boresighted to the laser receiver telescope so that the visual crosshair is co-incident with the angle of light arriving from the target onto the detector center. The preferred quadrant detector is typically circular in area with a cross dividing the active area into four equal quadrants. Laser light from the distant target is partly focused by a lens to form a spot on the detector. The degree of focus controls the spot size. When this spot is in the center of the detector, an equal photocurrent flows in each of the four quadrants ("null") and this condition exists when the target is aligned to the reticule crosshair. When the target is in a particular quadrant of the visual field of view, then it is in a corresponding quadrant of the detector and the photocurrent from the laser pulse is amplified and processed to provide an indication of the target position and thus direction to null. The visual telescope is typically fitted with a laser protective glass that absorbs laser light and protects the eye.

Circuit Description

Figure 4:
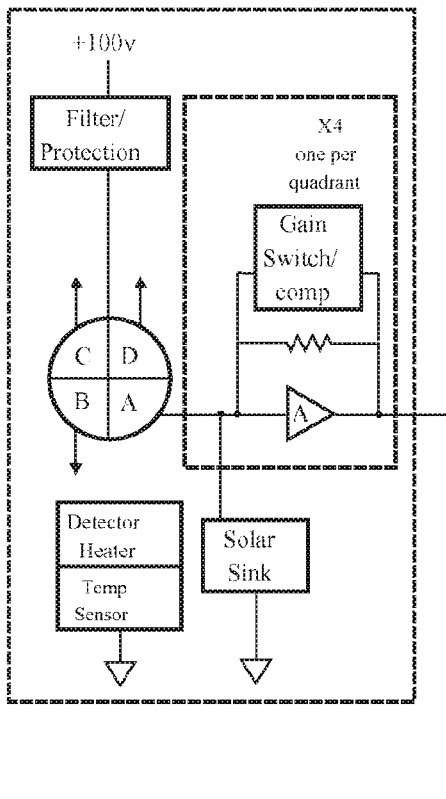
FIG. 4 is a schematic diagram of an exemplary embodiment of an optical target tracking receiver, according to the invention.
Figure 4:
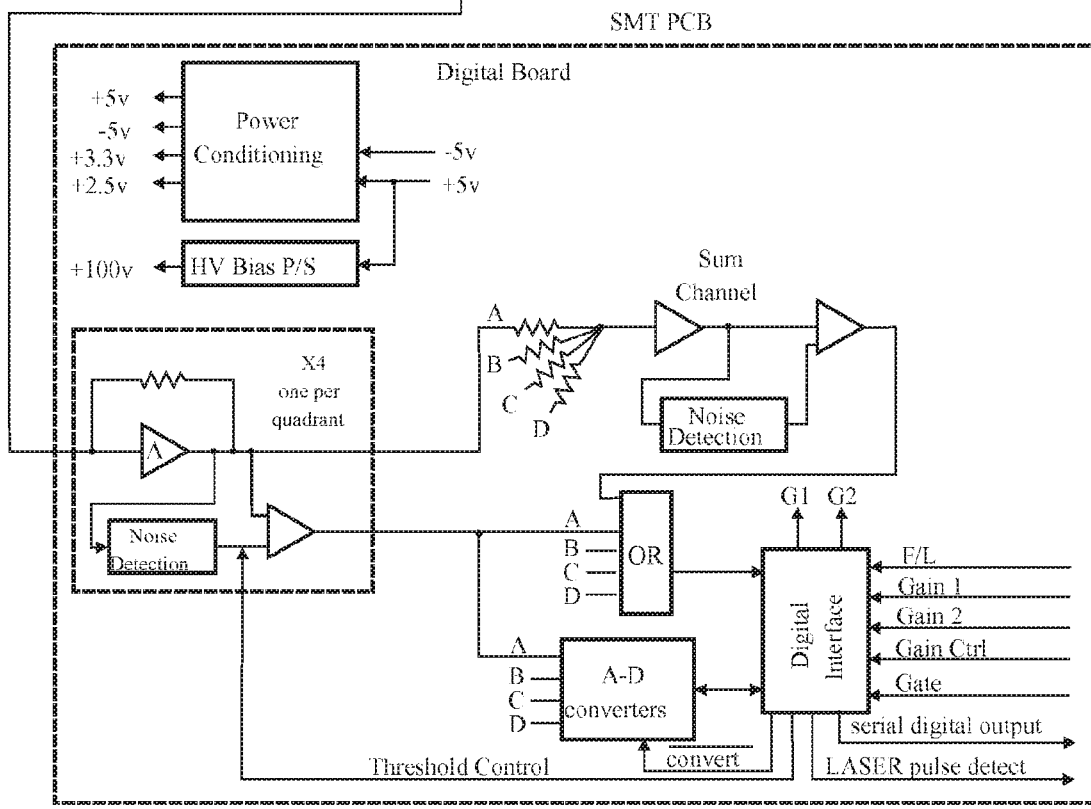

FIG. 4 illustrates exemplary electronics for SPOTTR. Generally, a hermetic shielded package exemplary houses the quadrant detector (ABCD), and associated electronics. A signal is output to a digital board which has functions such as noise detection, power conditioning, and the like, as shown, and as described in greater detail hereinbelow. (See also product data sheet for Model 741DP Quadrant Tracking Detector/Processor, Analog Modules Inc., Longwood, Fla., USA, 2 pp, 08/2005.)

Analog Electronics

Each quadrant of the photodetector feeds a low noise amplifier, preferably with switched gain. (refer, for example, to U.S. Pat. No. 5,311,353). This allows for a high-gain low-noise operation with weak signals and a low-gain non-saturating mode for strong signals.

A post amplifier may also have switched gain to provide maximum amplification for weak signals and less gain for strong signals, interlaced with the preamplifier gain to provide four gain ranges.

This gain changing is driven from the signal amplitude, typically in the strongest channel, and can also assist in excluding low-level secondary laser reflections as the gain is reduced. The gain range currently in use may be displayed as a measure of signal strength or other methods such as peak detection, peak sample-and-hold, A-D (analog-to-digital) measurement, or other methods apparent to those skilled in the art may be used.

A threshold is set up to separate laser pulses from noise. An exemplary way to do this for the highest sensitivity is as follows:

Summing the signals from each of the four channels creates a sum channel. Each quadrant channel and the sum channel have a separate noise detector to measure the noise independently (five). This detected noise level is smoothed out to form a DC (direct current) level that may be scaled to form a threshold for a fast comparator. The five comparators are OR'ed at the output so that signals crossing the threshold in any of the five channels gives a laser detect output. The scaling is adjusted to set the thresholds at an acceptable false alarm rate. The advantage of the noise detectors is that the threshold is automatically adjusted to keep the signal-to-noise ratio constant (at the acceptable false alarm rate) regardless of variations in temperature or background light. Having a threshold comparator in each channel allows increased sensitivity of detection when the signal is in one channel only (compares full signal amplitude with the noise from one channel only), or when the signal is at null (compares full signal summed, times 4 per channel, with summation of four uncorrelated noises, times two of rms noise per channel) The laser detect is a digital signal that is processed for pulse repetition rate (PRF) as described below.

Digital Timing Processing

Two different modes of operation are possible.

In a first mode of operation (Mode 1), the desired code used to distinguish a particular laser pulse train may be set with switches, keyboard, or data lines into the SPOTTR, and all laser pulses are excluded except those that meet the correct timing requirements. The time between pulses, PRF (pulse repetition frequency) of the signals, or code description may be displayed.

A second mode of operation (Mode 2) allows the SPOTTR to look for all laser pulses regardless of code using high gain, within the field of view and simultaneously processes their timing to look for known codes (PRF's). The code or codes may be displayed, and the desired one selected. The SPOTTR then will track the position and strength of this laser pulse train/target whilst excluding the others if present. The presence of other lasers can be indicated. An audible output representing laser pulse train presence and signal strength or PRF can be generated from a pulse train and gain range, and fed to an ear bud or similar acoustical device with variations in sound possible depending on gain range (signal strength) or PRF.

One practical implementation is to use a counter driven by a stabilized and calibrated clock. For each laser pulse that is detected; the counter value (time stamp), direction and magnitude (signal strength) information is stored into a buffer. Each new laser pulse is compared to the existing buffered information to determine if it matches a prescribed pattern (code description). Time stamps are primarily used for determining code description matches but it is desirable to use an algorithm that does not require exact matches. Magnitude and direction information are primarily used to reduce other undesirable effects. This allows multiple signals (of the same or different code descriptions) to be tracked with a high degree of tolerance to false detections, multiple returns, missing laser pulses and clock synchronization errors.

Mode 1 operation is achieved by only outputting information that matches a given code description.

Mode 2 operation is achieved by outputting information that matches any allowed code description and allowing the user to select a code description, after which it will act similarly to Mode 1.

After a code description has been recognized, the buffer information can be used with the counter to predict an incoming laser pulse and adjust operational parameters (such as signal gain) for the expected laser pulse.

Other methods of implementing this function will be apparent to those skilled in the art, and alternative logic may be employed to match different coding methods used.

Direction Derivation

Assuming the use of a quadrant detector, there are several ways to derive the steering directional information. Once a laser pulse is detected by any or all of the comparators described above, then direction-determining comparators may be used to simultaneously sample or compare the amplitude of the laser pulse in the four channels. The simplest method is to compare the signal in opposite quadrants with a comparator and hold the data indicating the strongest. The steering indication on the display is given to steer towards the stronger of the two channels. At null, the steering indication will jitter between the two directions indicating that null is reached. The other two opposite quadrants are similarly compared and the steering direction is similarly displayed. This information is conveniently displayed in the form of four arcs, dots, or other indication each representing a 90-degree segment corresponding to a quadrant in the detector. Note that the detector segments must be appropriately aligned and connected to correspond to the display. The arc or dot lit on the display indicates a signal in its quadrant. To steer the sightline onto the target, the binocular or telescope system is moved to steer the crosshairs towards the lit arc.

The spot image size on the detector can be controlled by the focus of the optical system, and it is arranged to represent typically 5% to 10% of the field of view in angle. By this means it is possible to determine that the target position is near the crosshairs by sensing the spot image of the laser pulse on more than one quadrant. In a typical implementation, a set of fast comparators has a sum signal value divided by (for example) 20, using a resistive divider on one input. The second input looks at the signal in each channel at the time of a laser pulse. An output indicates that sharing is present, and the optional inner arcs or dots lit are used to indicate closeness to null. See, for example, FIGS. 3A-3D.

If the four quadrants are identified as A, B, C and D in clockwise rotational order (starting for example with top left, see FIG. 3A), then a second method of obtaining the directional information is by adding and subtracting quadrant signals. For example, elevation may be a function of (A+B)−(C+D), and azimuth a function of (B+C)−(A+D) where A is the quadrant at 9-12 o'clock. Again, the azimuth and elevation signal strengths may be compared to give a steering direction, or the signals may be digitized using A-D converters and processed digitally to give the desired steering information. A larger spot gives more analog position information at the expense of having to match the channels better for a given angular static boresight error. This sum and difference may be done using analog circuits and normalized by dividing by the sum channel value. These operations are known to those skilled in the art of laser trackers. The direction to the output null is visually displayed to allow target identification by a Spotter.

Detector

The detector may be implemented using avalanche photo-diode (APD) or PIN quadrant detectors, for example. The PIN detectors have a wider field of view, are cheaper, but give a range of about 5 Km, compared to ranges of 10 Km (day) and 17 Km (night) for the APD. Conversion from an APD to a PIN diode system only affects the bias control and possibly the optics. The electronic processing circuits are similar. An available APD quadrant detector is the Perkin Elmer C30927E-01

APD Size/Field of View (FOV)

It is generally desirable that the APD field of view (FOV) match the FOV of the visual path.

Using, for example, an APD part having a 1.5 mm diameter, with an f 0.8 optic and 30 mm aperture, the APD field of view (FOV) is 3.6 degrees. To match the FOV of the visual path (of the aforementioned M-25 gyro-stabilized binocular), 4.3 degrees is desired, requiring a faster optic design (f=0.7) or smaller collection aperture, both of which are undesirable. One having skill in the art will recognize that such tradeoffs need to be optimized in the detailed optical design, with consideration of the spot size on the detector for accurate boresight and linear area.

There are trade offs associated with the spot size. A small spot gives accurate boresight even with poor channel matching and dirty lenses. This tells which quadrant the target is in with excellent sensitivity as the signal is compared to the noise in only one quadrant. A large spot can give a larger linear region that helps locate the target and keep it acquired in the cross hairs. Too large of a spot results in boresight errors due to dirty lenses, channel-matching tolerances, APD gain tolerances, and spot spillover outside the detector FOV. The sensitivity is reduced because the noise from all four quadrants has to be considered when the spot is split. The spot size is easy to adjust by altering the lens focus on the detector.

APD Bias

The Background light level affects the APD gain that can be used, since the APD has a higher gain to background noise than signal. There is an optimum gain when the total APD noise equals the preamplifier noise. These noise sources are uncorrelated so the resultant noise in this condition is 1.41 (root 2) times the preamp noise. The preamp noise is fairly constant, so a threshold is set at this value (1.41 times preamp noise) and servos the APD bias until this ideal condition is achieved. A small amount of light may have to be injected using for example an LED in dark conditions to keep the bias control loop in a stable range. An advantage of this arrangement is that the best possible sensitivity is automatically achieved in various background light, temperature, and APD voltage tolerance conditions. This noise is measured in a sum channel of all four quadrants. The error signal controls the output voltage of a low noise, +500 volt (maximum) power supply. A narrow band filter is used to minimize the amount of background noise in daylight, thus increasing the acquisition range.

Preamplifiers

Low noise transimpedance amplifiers are used to convert the photocurrents into a voltage pulse. The inputs are protected against an overloading pulse and direct sunlight. Background light causes a photocurrent to flow in the detector that could saturate the high gain preamplifier. AMI has developed a "solar sink" that absorbs this current with out affecting the preamp gain. The preamplifiers are designed for both low voltage and current noise to allow long-range signal detection with the capacitance of either an APD or PIN detector. To handle a wide range of signals, the amplifiers have a switched gain range of 100:1. (A solar sink is a controlled current source that absorbs the photocurrent.)

Post-amplifiers

The post-amplifiers are optimized for large signal swings and provide a second gain-switched stage to give a total of four overlapping gain stages.

Sum Channel

The four channels are combined in a summing amplifier. The noise in this sum channel is measured and used to control the APD as described above.

Threshold Controls

Although the sum noise is controlled, there will be individual noise variations in each channel. Normally the signal is initially in one of the four quadrants, so the best detection range is achieved when the signal is compared to a multiple-of-noise-based threshold in each channel individually. This comparison is done using a high-speed comparator with a TTL output. The noise in each channel is measured and smoothed into a DC value. This value is scaled by an amplifier whose gain is determined by the acceptable false alarm rate (FAR). False alarms are caused when random noise crosses the threshold of signal detection. In this system, improved performance can be achieved because an increased false alarm rate is more acceptable with a visual display compared to an automated tracking system. The output of the DC amplifier is the detection threshold. When a laser pulse signal crosses threshold, a digital output is generated. The outputs of all four comparators are OR'ed to give a common Laser Detect signal.

A-D Converters

The Laser Detect is sent to the programmable gate array that triggers simultaneous sampling of four A-D converters. Each converter measures the close-to-peak value of the laser pulse in its channel, and outputs a digital word representing this value. These words are sent to the programmable gate array (DSP). The gate array generates the signals for the reticule to indicate the direction to move the binocular. This is an alternative to the "bang-bang" method where opposite quadrants are compared.

Display

An intuitive display is envisioned to allow the user to center the target in the null position without obscuring the target. This is achieved with a low-cost display board using surface mount (SMT) light emitting diodes (LEDs).

As an example of a possible display, FIG. 3A shows a target far out of null in one quadrant and provides a single illuminated arc centered in that quadrant and near the edge of the FOV. FIG. 3B indicates that the target is on axis in elevation (up and down in the FOV) by illumination of arcs bisecting the elevation axis and off axis on azimuth. FIG. 3C shows the target driving towards null with the two inner illuminated arcs showing the target is entering the "linear" region where the spot is illuminating at least 3 quadrants. (Two arcs could be illuminated away from the null (at the junction of two quadrants), and a third, opposite quadrant indicator would be illuminated to indicate that the light spot has reached the center region.) FIG. 3D identifies the target in the null position (on target) through illumination of equal spaced arcs in all four quadrants.

In addition to the position (close and far) of the illuminated arcs, the intensity of the arcs may be pulse width modulated (PWM) with highlighted reticule areas receiving maximum optical signals. A visual meter (not shown) may be provided to gauge total signal strength and the nominal PRF can be determined and represented on the display.

This represents one of many possible display configurations. The display may be projected into the left eyepiece against a dark background. This is the simplest approach, and the eye will allow superimposition of the display (direction information) onto the target scene. A more complex solution is to project the display into the right eyepiece and combine it with the scene. One having skill in the art will recognize that relatively minor design changes could result in the display being optimized for the preference of the user.

Generally, the spot is initially detected when it is in one quadrant only, giving a steering direction but no absolute position. When the binocular cross-hair 308 is brought closer to the target, linear outputs are generated from multiple quadrants to give more accurate proportional steering information, which may be displayed in a number of ways to pinpoint the target. For example, a suggested method is to steer for equal brightness on all arcs of the aim circle.

The invention has been illustrated and described in a manner that should be considered as exemplary rather than restrictive in character—it being understood that only preferred embodiments have been shown and described, and that all changes and modifications that come within the spirit of the invention are desired to be protected. Undoubtedly, many other "variations" on the techniques set forth hereinabove will occur to one having ordinary skill in the art to which the present invention most nearly pertains, and such variations are intended to be within the scope of the invention, as disclosed herein.

What is claimed is:

1. Method of verifying that a target is being illuminated by a laser from a designator comprising:
    providing a composite device, separate from either of the designator or the target, comprising an optical portion having a field of view for viewing the target in the field of view, and a opto-receiver portion for receiving scattered laser light;
    viewing the target in the field of view of the composite device; and
    displaying information in the field of view of the composite device about a direction of the received laser light from the target;
    wherein displaying information about the direction comprises:
    providing at least one set of quadrant arcs in the field of view, and selectively illuminating the quadrant arcs to indicate the direction of the received laser light in relation to the target;
    wherein providing at least one set of quadrant arcs in the field of view comprises:
    providing a set of inner quadrant arcs, and illuminating appropriate ones of the inner arcs when the received laser light is close to a center of the field of view; and
    providing a set of outer quadrant arcs, and illuminating appropriate ones of the outer arcs when the received laser light is far from the center of the field of view.

2. The method of claim 1, further comprising:
    when viewing the target, centering the target in a reticule in the field of view.

3. The method of claim 1, wherein displaying information about the received laser light comprises:
    displaying information about intensity of the received laser light in the field of view.

4. The method of claim 1, wherein the laser light is encoded using a pulse coding system to ensure that a specific seeker and designator combination work in harmony, and wherein displaying information about the received laser light comprises:
    displaying the code in the field of view.

5. The method of claim 4, wherein multiple targets are laser-illuminated by multiple designators, each having a unique code, and further comprising:
    tracking the multiple designators in the field of view, and toggling through the designators.

6. The method of claim 5, wherein:
    in a first mode of operation, only outputting information that matches a given code; and
    in a second mode of operation, outputting information that matches any allowed code description and allowing the user to select a code description, after which only information matching the selected code is output.

7. The method of claim 1, wherein:
    the optical portion includes a reticule centered in the field of view.

8. Apparatus for viewing a target and determining a direction and distance of a spot of received laser light comprising:
    a visual system, separate from either the target or a source of the laser light, comprising viewing optics for viewing a scene which contains the target;
    an electronic system for collecting the received laser light with a segmented detector capable of sensing an angle of the spot of received laser light;
    means for generating information pertaining to a distance and direction of the spot of received laser light from the target; and
    display means for superimposing the information onto a view of the scene which contains the target;
    wherein the display means comprises:
    a set of inner quadrant arcs which, when illuminated, indicate that the received laser light is close to a center of the field of view; and
    a set of outer quadrant arcs which, when illuminated, indicate that the received laser light is far from the center of the field of view.

9. The apparatus of claim 8, wherein:
    the display means indicates a direction to move to a null, which is boresighted with a reticle in the viewing optics to superimpose crosshairs onto and therefore identify the far-field target from which the laser radiation is coming.

10. The apparatus of claim 8, further comprising:
    a decoder to selectively track laser pulse trains with a pre-determined code.

11. The apparatus of claim 10, further comprising:
    logic to identify the codes in use within the view, and means for selecting a chosen code (designator) to track.

12. The apparatus of claim 10, further comprising:
    means for indicating signal strength of the received laser light.

13. The apparatus of claim 8, wherein:
    the means for generating information pertaining to a distance and direction comprises a segmented detector; and
    the segmented detector comprises an avalanche quadrant detector to detect laser radiation.

14. The apparatus of claim 13, further comprising:

a high-voltage bias power supply adjustable as a function of background light to maintain the detector at a bias point for optimum signal-to-noise ratio.

15. A method of verifying that a target has been illuminated by a laser designator for illuminating objects with laser light comprising:

viewing the target with an optical portion of a device, in a field of view of the device, wherein said device is separate from the laser designator;

providing indications, in the field of view of the device, about a direction and distance of laser light scattered from an object which has been illuminated by the laser designator with respect to the target;

wherein the indications comprise:

providing a set of inner quadrant arcs, and illuminating appropriate ones of the inner arcs when the received laser light is close to a center of the field of view; and providing a set of outer quadrant arcs, and illuminating appropriate ones of the outer arcs when the received laser light is far from the center of the field of view.

16. The method of claim 15, wherein the indications comprise:

at least one set of quadrant arcs are selectively be illuminated to serve as steering commands for re-aiming the optical device.

17. The method of claim 15, further comprising:

displaying at least one of a code associated with the received laser light and a signal strength of the received laser light.

\* \* \* \* \*